United States Patent
Schworm

(10) Patent No.: US 7,551,949 B2
(45) Date of Patent: Jun. 23, 2009

(54) ENCLOSURE, PARTICULARLY A HOUSING FOR A MOBILE TELECOMMUNICATION DEVICE AND METHOD FOR THE PRODUCING A HOUSING PART

(75) Inventor: Ernst Schworm, München (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/521,389

(22) PCT Filed: Jul. 18, 2003

(86) PCT No.: PCT/DE03/02431

§ 371 (c)(1),
(2), (4) Date: Jan. 18, 2005

(87) PCT Pub. No.: WO2004/017614

PCT Pub. Date: Feb. 26, 2004

(65) Prior Publication Data

US 2006/0166711 A1   Jul. 27, 2006

(30) Foreign Application Priority Data

Jul. 19, 2002   (DE) ................................. 102 32 947

(51) Int. Cl.
*H04B 1/38*   (2006.01)
(52) U.S. Cl. .................. 455/575.1; 455/90.3; 455/128; 455/575.8
(58) Field of Classification Search ................ 455/90.3, 455/347, 550.1, 562.1, 575.1, 575.5, 128, 455/575.8, 348, 349
See application file for complete search history.

(56) References Cited

U.S. PATENT DOCUMENTS

| 4,225,970 | A |   | 9/1980  | Jaramillo et al. |
| 4,418,830 | A | * | 12/1983 | Dzung et al. ................. 220/614 |
| 4,711,361 | A | * | 12/1987 | Mischenko ................. 220/4.28 |
| 5,166,898 | A | * | 11/1992 | Ishihara ....................... 708/505 |
| 5,386,084 | A |   | 1/1995  | Risko |
| 5,526,526 | A |   | 6/1996  | Clark et al. |
| 5,665,485 | A | * | 9/1997  | Kuwayama et al. ......... 429/100 |

(Continued)

FOREIGN PATENT DOCUMENTS

CN   1300496   6/2001

(Continued)

OTHER PUBLICATIONS

Römps Chemielexikon, 8*th* Edition, p. 1082, Franksche Verlagshandlung Stuttgart, 1981.

*Primary Examiner*—John J Lee
(74) *Attorney, Agent, or Firm*—Buchanan Ingersoll & Rooney PC

(57) ABSTRACT

The invention relates to an enclosure, particularly a housing for a mobile telephone, comprised of a first enclosure base body and of a second enclosure base body with a seal made of a sealing material. This seal is joined in a fixed manner to the first enclosure base body and sealingly rests against a second edge of the second enclosure base body. The seal is made of an elastically deformable sealing material. The invention also relates to a method for producing a housing part for a mobile telephone provided with an elastic seal according to the two-color injection molding method.

16 Claims, 5 Drawing Sheets

U.S. PATENT DOCUMENTS

| | | | | |
|---|---|---|---|---|
| 5,896,453 | A | * | 4/1999 | Speaks ................. 379/433.01 |
| 5,970,402 | A | * | 10/1999 | Vermeer ..................... 455/347 |
| 6,078,792 | A | * | 6/2000 | Phillips .................. 455/575.1 |
| 6,333,716 | B1 | * | 12/2001 | Pontoppidan ............... 343/702 |
| 2004/0082370 | A1 | * | 4/2004 | Gahl et al. ............... 455/575.5 |
| 2004/0102230 | A1 | * | 5/2004 | Nuovo .................... 455/575.1 |
| 2004/0168243 | P1 | * | 8/2004 | Gonzalez | |
| 2004/0211668 | A1 | * | 10/2004 | Montminy et al. .......... 204/533 |
| 2006/0049030 | A1 | * | 3/2006 | Grems et al. ................ 200/333 |
| 2006/0097376 | A1 | * | 5/2006 | Leurs et al. ................. 257/690 |

FOREIGN PATENT DOCUMENTS

| | | |
|---|---|---|
| DE | 93 11 554 U1 | 12/1993 |
| DE | 44 28 335 A1 | 2/1996 |
| DE | 196 18 453 A1 | 10/1996 |
| DE | 19630966 A1 | 3/1997 |
| DE | 197 18 453 C1 | 9/1998 |
| DE | 298 19 434 U1 | 4/1999 |
| EP | 0 180 383 A2 | 5/1986 |
| EP | 1 096 759 A1 | 5/2001 |
| GB | 2 345 818 A1 | 7/2000 |
| JP | 06297497 | 10/1994 |
| JP | 11025940 A | 1/1999 |
| JP | 2000299725 A | 10/2000 |
| WO | WO 97/08926 A2 | 3/1997 |
| WO | WO 00/08722 | 2/2000 |
| WO | 0062509 A1 | 10/2000 |
| WO | 0108381 A1 | 2/2001 |
| WO | WO 01/83381 A1 | 11/2001 |

\* cited by examiner

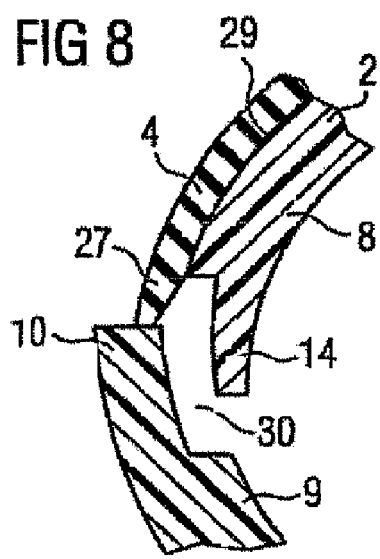
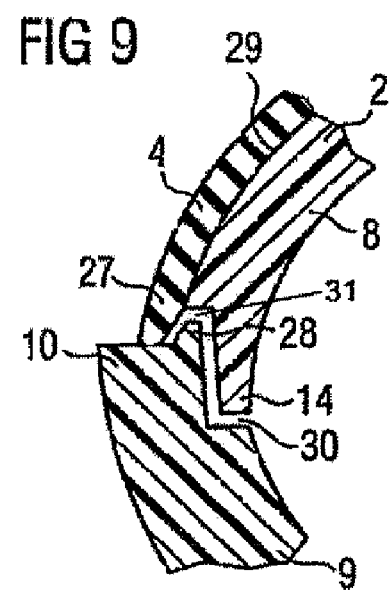

ENCLOSURE, PARTICULARLY A HOUSING FOR A MOBILE TELECOMMUNICATION DEVICE AND METHOD FOR THE PRODUCING A HOUSING PART

CROSS REFERENCE TO RELATED APPLICATIONS

This application is the US National Stage of International Application No. PCT/DE2003/002431, filed Jul. 18, 2003 and claims the benefit thereof. The International Application claims the benefits of German application No. 10232947.8 filed Jul. 19, 2002, both applications are incorporated by reference herein in their entirety.

FIELD OF THE INVENTION

The invention relates to an enclosure having a first enclosure base body and a second enclosure base body. In particular, the invention relates to an enclosure which constitutes a housing for a mobile telecommunication device. The invention also relates to a method for producing a housing part for a mobile telecommunication device.

BACKGROUND OF THE INVENTION

The British patent application GB 2 345 818 describes a portable telecommunication component, a hand-held mobile radio device. This consists of a plurality of components, in particular a keypad, a display field, an upper housing and a lower housing, and a battery part. The individual components are assembled by inserting the keypad into the upper housing, then inserting the component containing the display into the upper housing and subsequently screwing together the lower housing and the upper housing. The lower housing contains a recess into which the battery part is introduced. Patent application GB 2 345 818 A specifies different possible ways of screwing together the upper housing and the lower housing or inserting one into other.

The international patent application WO 01/083381 A1 relates to a mobile telecommunication device having an upper housing shell comprising an integrated keypad and display. To this end, a transparent plastic housing is produced in an injection molding process by injecting a plastic into a mold and makes a connection with a film in such a way that an upper housing shell is produced. In this situation, the plastic housing has a first area which serves as a display window, and also a second area having at least one cutout with means for transmitting a key depression. The film covers at least the second area and implements a key, located above the cutout, which in particular is identified by a character printed on the film and whereby a key depression is transmitted by way of the means.

The German patent specification DE 196 18 453 C1 relates to a 2-component plastic housing, in particular for a key with remote operation facility for a motor vehicle. The housing is produced such that an elastic material which is used as a mounting support for a printed circuit board is injected in an upper housing part. Furthermore, the elastic material also serves as a seal between this upper part and a lower part of the housing, whereby this seal is located inside the lower part.

The German published patent specification DE 196 30 966 A1 relates to a method for producing a housing part having a shielding effect for radio devices, in particular a handset for a radio device. In this situation, a conductive seal is arranged on a lower shell, which seal is used for making contact with a printed circuit board. The seal simply makes a seal between the lower shell and the printed circuit board.

The German published patent specification DE 44 28 335 A1 relates to a plastic housing for an electrical module having a housing body and a base plate. A seal, which can also be produced using a method such as the two-color injection molding process, is used in order to seal an opening in the housing body as well as in one of the embodiments shown as a seal between the housing part and the base plate.

The German utility model DE 298 19 434 U1 describes a housing with a shielding seal for the electromagnetically shielded accommodation of electronic components, particularly of a mobile telecommunication device device. A sealing profile, which in its initial state has a pasty consistency or is foamed in a liquid form and becomes an elastically hardened plastic, is applied to a first housing part. In this situation, the hardened sealing material does not adhere to the upper part. The German utility model 93 11 554 U1 describes a sealing strip for sealing a slot in a slide control, whereby a seal is cast onto the sealing strip. The material comprising the strip is harder than the material comprising the seal which can be a soft, rubber-elastic material having a Shore hardness of 50.

The international patent application WO 00/08722 A1 relates to a mobile radio telephone having a moisture-resistant electrical contact. The mobile radio telephone has a housing with an upper housing part and a lower housing part which together form a shell that surrounds the components contained therein. The moisture-resistant electrical contact is located outside the housing and penetrates the lower housing part, whereby it is connected by means of a spring arm to the electrical circuits of the mobile radio telephone. By melting the electrical contact into the lower housing parts a moisture-resistant connection is produced between the material comprising the lower housing part and the electrical contact.

More rigorous demands can be made of the housings or enclosures for electrical devices or enclosures and also of storage containers, for example for the storage of perishable foodstuffs or weather-sensitive objects, in respect of their capability to seal against moisture, dust or other detrimental influences. With regard to a mobile telecommunication device, for example a cordless telephone or a mobile radio telephone, the first enclosure base body can be a so-called upper shell and the second enclosure body base can be a so-called lower shell, or vice versa.

SUMMARY OF THE INVENTION

The object of the present invention is to specify an enclosure comprising at least two enclosure base bodies, whereby a sealing function is implemented between the two enclosure base bodies.

This object is achieved according to the invention by an enclosure, particularly a housing for a mobile telecommunication device, having a first enclosure base body made of a first base material comprising a first edge and having a second enclosure base body made of a second base material comprising a second edge. The two enclosure base bodies butt against one another along the first edge and the second edge and have a seal there made of a sealing material which is permanently fixed to the first enclosure base body and which makes a seal resting against the second edge, whereby the sealing material consists of an elastically deformable material.

The enclosure can preferably be a housing for accommodating electrical devices or mechanical elements, components or equipment. In particular, in this situation this can be a mobile radio telephone, in other words a mobile radio terminal device, a cordless telephone also for use in an industrial environment, such as for example in repair and production workshops, paint shops right through to a potentially explosive environment such as for example in the petrochemical industry. Other possible enclosures can be provided for pocket calculators, electronic appointment planners, sensor housings, clocks and other items. In this situation, a corresponding housing can have a length of just a few up to several tens of centimeters, a width of likewise just a few up to several tens of centimeters and accordingly a height of just a few up to likewise several tens of centimeters. Typical dimensions for mobile radio terminal devices and cordless telephones lie in the order of a length of 5 to 20 centimeters, a width of 2 to 5 centimeters and a height of 1 to 3 centimeters. In this situation the actual seal can run along the edge or circumference of a corresponding housing and have a width of less than one millimeter up to several millimeters and a height of below one millimeter up to several millimeters. With regard to a housing for a mobile telecommunication device, for example a cordless telephone or a mobile radio telephone, the first enclosure base body can be a so-called upper shell and the second enclosure base body can be a so-called lower shell, or vice versa.

A seal which is permanently fixed to the first edge, and in particular is linked conclusively and in integrated fashion to first base body itself actually implements a sealing effect in respect of the first enclosure base body. The seal is an integral part of the first edge. A sealing effect in respect of the second enclosure base body is achieved by means of the elastic deformability of the material comprising the seal in that when the first edge and the second edge are pushed together the sealing material deforms elastically against the second edge and thus largely implements a sealing effect against the penetration of moisture, dust or similar.

Such an enclosure is therefore suitable for accommodating sensitive objects such as electronic devices or mechanical equipment and also foodstuffs which require protection against ambient influences such as moisture, water, chemicals, dust or also mechanical influences for example. Having a fixed joint between the seal and the first enclosure base body reduces the number of loose elements or elements which can be displaced with respect to one another in order to produce a sealing connection between the first enclosure base body and the second enclosure base body on these two enclosure base bodies. It is therefore not necessary to provide a separate seal, for example in the form of a sealing ring and to provide corresponding holding devices, grooves or other mounting facilities for this purpose with their associated production resource requirement. The number of enclosure parts to be provided is thus also reduced, which simplifies both the storage and also the handling of the enclosure parts. By preference, the seal is located on the outside of the first enclosure base body which for example can be an upper shell of a housing for a mobile telephone. By this means, a penetration of dust, moisture etc is largely inhibited actually on the outside of the first enclosure base body and thus also at the edge of the second enclosure base body, with the result that no dust, moisture or similar is able to collect between first enclosure base body and second enclosure base body. The seal preferably projects beyond the first enclosure base body on the outside in the direction of the second enclosure base body. Furthermore, by preference, a labyrinth seal can be formed from the first enclosure base body, the seal and the second enclosure base body. This can be implemented in a plurality of ways, whereby for example the second enclosure base body is undercut in the manner of a step and the first enclosure base body projects into this step such that the first enclosure base body and the second enclosure base body overlap. In addition, it is possible for the second enclosure base body, when viewed from the outside in, to have a prominence behind the seal in the direction of the first enclosure base body, as a result of which a narrow channel can be formed between first enclosure base body and second enclosure base body in the interior of the housing behind the seal.

By preference, the second edge against which the seal rests is produced from a harder material than the seal itself. In this situation, the second enclosure base body can preferably be produced from a single material which is simultaneously also used as the material for the second edge. It is likewise also possible to produce the second edge from a different material than is used for the remainder of the second enclosure body. The first enclosure body can likewise preferably be produced from a harder material than is used for the seal.

In this situation, the first enclosure base body is preferably produced from a hard plastic and the seal from a soft plastic.

By preference, the first enclosure base body is produced together with the seal using the so-called two-color injection molding method. In two-color injection molding, also known as two-component injection molding, plastic materials for individual components and functional elements also employing different materials and hardness (hard/soft combinations) are produced in a single processing cycle, which can result in considerable savings in assembly costs. Depending on the choice of materials, components or elements produced in this way are resistant to external influences and are characterized by a high adhesive strength. An adhesion achieved in the boundary surface area can in this situation brought about by means of a chemical bond or mechanical anchoring. With regard to chemically compatible plastics, a permanent molecular bond is generally achieved by means of melting or welding. The two-component injection molding method is based on the friction-locked and/or form-locked connection of two plastic components having generally different properties to form an integrated shaped part. The two-component injection molding method is particularly suitable for components which are intended to have both rigid and elastic area, as a result of which different functions can be implemented simultaneously.

The material for the seal is preferably a thermoplastic elastomer. Elastomers are understood to include synthetic or natural polymers with rubber-elastic properties, as described for example in Römpps Chemielexikon 8th Edition, p. 1082, Franksche Verlagshandlung Stuttgart, 1981. Thermoplastic elastomers can be obtained for example from Kraiburg TBE GmbH, Teplitzer Strasse 20, D-84478 Waldkraiburg, Germany. With regard to thermoplastic elastomers, these can be such as are based on SEBS and SEPS (filtered styrol block copolymers).

A thermoplastic material is preferably used for the first base material of the first enclosure base body. The second base material for the second enclosure base body likewise preferably consists of a thermoplastic material. According to the above Römpps Chemielexikon, thermoplastic materials are at normal temperature, particularly room temperature, hard or even brittle plastics which soften reversibly on the application of heat and become mechanically easily deformable. Furthermore, thermoplastic materials are defined in Deutsche Industrienorm 7724 (DIN, German Industrial Standard).

The sealing material comprising the seal preferably exhibits a Shore hardness of between 50 and 60. In accordance with the above Römpps Chemielexikon, the Shore hardness is defined according to Deutsche Industrienorm (DIN) 53505 by way of the resistance of elastomers, rubber and natural rubber to the penetration of a truncated cone.

By preference, a housing for a mobile telecommunication device, which can be a handset for a cordless telephone or for a mobile radio telephone, has a third enclosure base body which serves to accommodate an exchangeable electrical power source, in particular a battery or a rechargeable accumulator. In this situation, the third enclosure base body butts either against the first enclosure base body or against the second enclosure base body and is sealed with respect to the corresponding enclosure base body by means of a further elastic seal. The further seal is preferably located either on the third enclosure base body itself or on the enclosure base body butting against the latter, in other words the first or the second enclosure base body. In this situation the seal can be of the same type as the seal between the second and the first enclosure base body, in particular it can in a two-color injection molding method form an integral part with the third enclosure base body or the first or second enclosure base body associated with the latter.

By applying the seal to one of the enclosure base bodies it is possible, as already described above, to establish a sealing effect between the enclosure base bodies butting against one another, in particular against moisture and dust, in a simple manner with a small number of individual components.

According to the invention, the object directed towards a method for producing a housing part, in particular for a mobile telecommunication device, is achieved by a method in which an elastic seal is applied using the two-color injection molding method. In a first production step, a hard component is injected onto a fixed tool and the hard component is shaped by means of a first countertool which moves in a mold release direction. In a second production step, a soft component forming the seal is injected onto the hard component and is shaped by means of a second countertool which is moved in the same mold release direction as the first countertool in order to release the mold. Releasing the mold both for the hard component and also for the soft component in the same direction provides a simple and fast but also cost-effective production method for a housing part having a sealing function, as a result of which the danger of backspraying is excluded or at least considerably reduced. If slight backspraying should occur, then this would occur firstly at non-visible locations and secondly at non-load locations in the circular slot and would therefore be unproblematic. By using only two countertools, also referred to pressing dies, only a minimum effort with low costs is required in order to produce the tools. Compared with a production method using four pressing dies, the production method can be accelerated and implemented more cost-effectively.

By preference, the method employs a rotary platen mold on which at least two housing parts of the same type are processed. By rotating the rotary platen mold, a housing part currently undergoing processing is passed from a first processing operation, the application of the hard component, to a second processing operation, the application of the soft component. By using a rotary platen mold, the production time for a large number of housing parts of the same type can therefore be reduced. At one point in time during processing, the hard component is produced at one position on the rotary platen mold while at the same time at another position on the rotary platen mold the soft component is being applied to an already produced hard component of the housing part. After the rotary platen mold has rotated, the housing part with a hard component and a soft component is removed and the housing part with the hard component is rotated into the position in which the soft component is applied at the next point in time during processing.

By preference, the soft component is applied to the hard component while the hard component is still warm. In this context, warm means that the hard component still has a temperature at which a bonding of the soft component to the hard component takes place, in particular a chemical molecular bonding, which is stronger than would be the case at normal room temperature.

The enclosure, particularly a housing for a mobile telecommunication device, and also the method for producing a housing part will be described in detail by way of example with reference to the drawing. Other embodiments are naturally also possible, which are also covered by the invention. In this situation the figures show a representation, not necessarily to scale and partly schematized, of a mobile telecommunication device.

BRIEF DESCRIPTION OF THE DRAWINGS

FIG. 8 shows a section through a longitudinal section of an enclosure with a first enclosure base body, having a seal, and a second enclosure base body, and FIG. 9 shows a section through a further enclosure with a first enclosure base body and seal and also a second enclosure base body.

Figure 1:
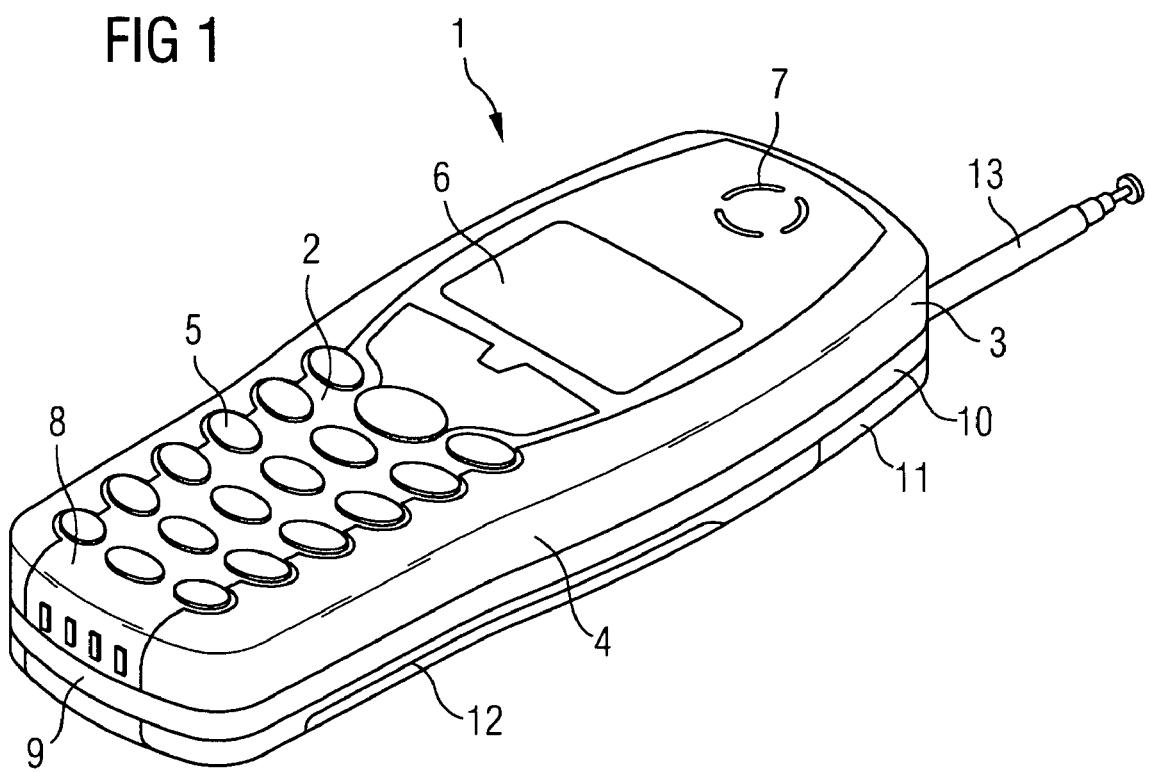
FIG. 1 shows a perspective view of a housing of a mobile telecommunication device.

The reference numerals have the same meaning in all the figures.

DETAILED DESCRIPTION OF THE INVENTION

FIG. 1 shows a perspective view of an enclosure 1, here a housing 1 for a mobile telecommunication device. The housing 1 has a first enclosure base body 2 which is produced from a hard component 8, onto which is applied an elastically deformable soft component 4 on a first edge 3, essentially corresponding to the outer circumference of the first enclosure base body 2. In the first enclosure base body 2, which represents an upper shell 2, openings are provided for keys 5, a display 6 and a loudspeaker 7. The hard component 8 is produced from a first base material, in particular a thermoplastic material. The housing 1 has a second enclosure base body 9, a lower shell. This lower shell 9 has a second edge 10 which butts against the first edge 3 of the upper shell 2. In this situation, the second edge 10 comes into direct contact with the soft component 4, the seal 4, such that the housing 1 is sealed to prevent the penetration of dust and moisture. On the side facing away from the upper shell 2, a further soft component 11 is applied onto the lower shell 9 at least in an area for accommodating a third enclosure base body 12, a battery or accumulator part. A send and receive antenna 13 additionally projects from the housing 1.

Figure 2:
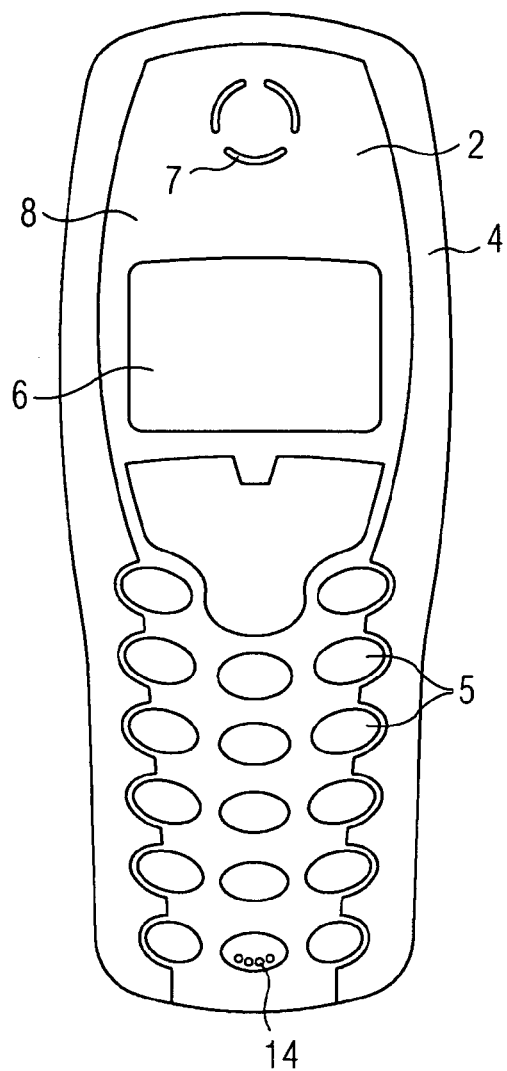
FIG. 2 shows an enclosure base body, an upper shell, of a mobile telecommunication device.

FIG. 2 shows an alternative embodiment of a first enclosure base body 2, an upper shell of a cordless mobile telecommunication device in a top view of the outside. The upper shell 2 likewise has openings for keys 5, a display 6, a loudspeaker 7 and also a microphone 14. Around the outer circumference, a first edge 3 of the first enclosure base body 2, a soft material is applied on the outside which, as represented schematically in FIG. 4, is directed in the form of a flange away from the outside beyond a first base material forming a hard component 8 towards to a second enclosure base body 9 (see FIG. 3). The soft component 4 is also applied to the outside of the upper shell 2 in the form of a broad band where it has no sealing function. In this situation it can serve as an additional visual element.

FIG. 4 shows a top view of the interior of an upper shell 2 according to FIG. 2. On the inside of the upper shell 2 the hard component 8 has running around its outer circumference an outer flange 14 which is directed inwards. Further out still, the soft component 4 runs around this outer flange 14, thereby forming a sealing flange 27. The outer flange 14 and also the seal 4 projecting inwards are spaced apart from one another, for example by less than 1 mm or up to several mm. The sealing flange 27 and the outer flange 14, which are spaced apart from one another by a corresponding recess, are formed by the hard component recess 24 and the soft component recess 25. In this situation, it is both possible that the sealing flange 27 projects beyond the outer flange 14 or vice versa or both terminate at the same level. Within the area of the hard component 8 enclosed by the outer flange 14 the former has locking flanges 15 and also guide cylinders 16. These serve to engage in corresponding counterflanges and cylinders situated on the lower shell 9 for fixing purposes and for holding together the upper shell 2 and the lower shell 9 to form a housing 1.

By means of the sealing flange 27 and the outer flange 14 which preferably extends into the lower shell 9, a channel of a labyrinth seal 30 is formed between the sealing flange 14 and the second edge 10 (see FIG. 8). In the embodiment according to FIG. 9 with the additional sealing flange 28 which extends into the recess between the sealing flange 27 and the outer flange 14, an even narrower channel is formed between upper shell 2 and lower shell 9 of a labyrinth seal 30.

Figure 3:
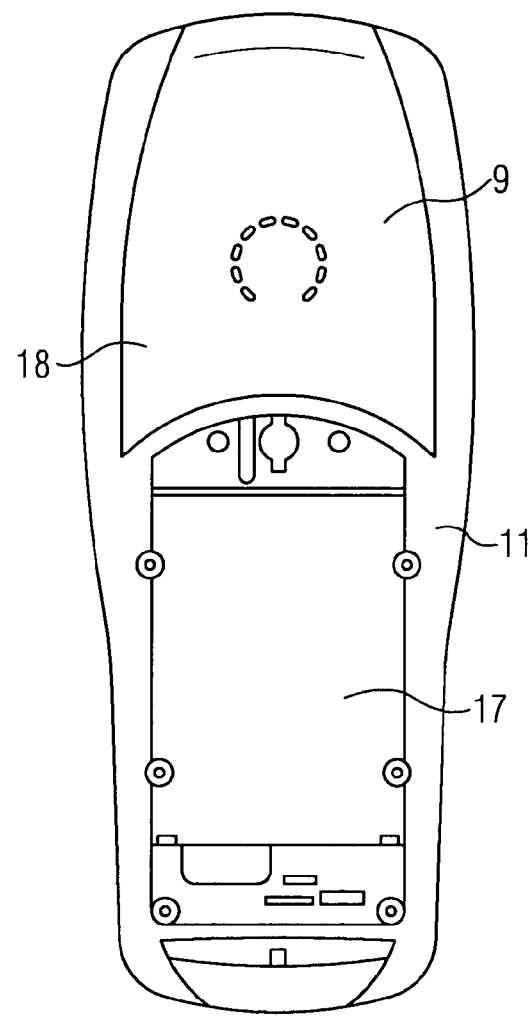
FIG. 3 shows a top view of a lower enclosure base body, a lower shell.
Figure 4:
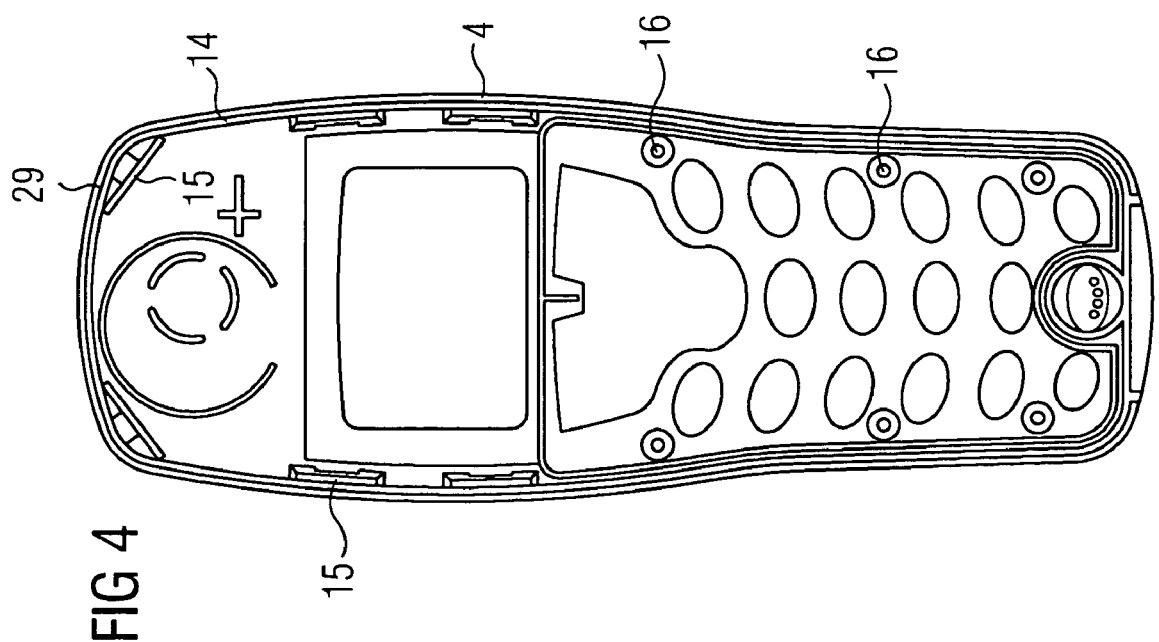
FIG. 4 shows a top view of the interior of an upper shell according to FIG. 2.

FIG. 3 shows a top view, onto the outside, of a lower shell 9, matching the upper shell 2, according to FIG. 2. The lower shell 9 has receiving area 17 for an accumulator part which is not shown. The receiving area 17 is edged by a further soft component 11 which is applied to the hard component 18 (second base material) of the lower shell 9. In this situation, the further soft component 11 forms the seal between the lower shell 9 and the accumulator part which is not shown. The hard components 8 and 18 are preferably produced from the same base material, in particular a thermoplastic material. Soft components 4, 11 are likewise preferably produced from an identical sealing material, in particular a thermoplastic elastomer.

Figure 5:
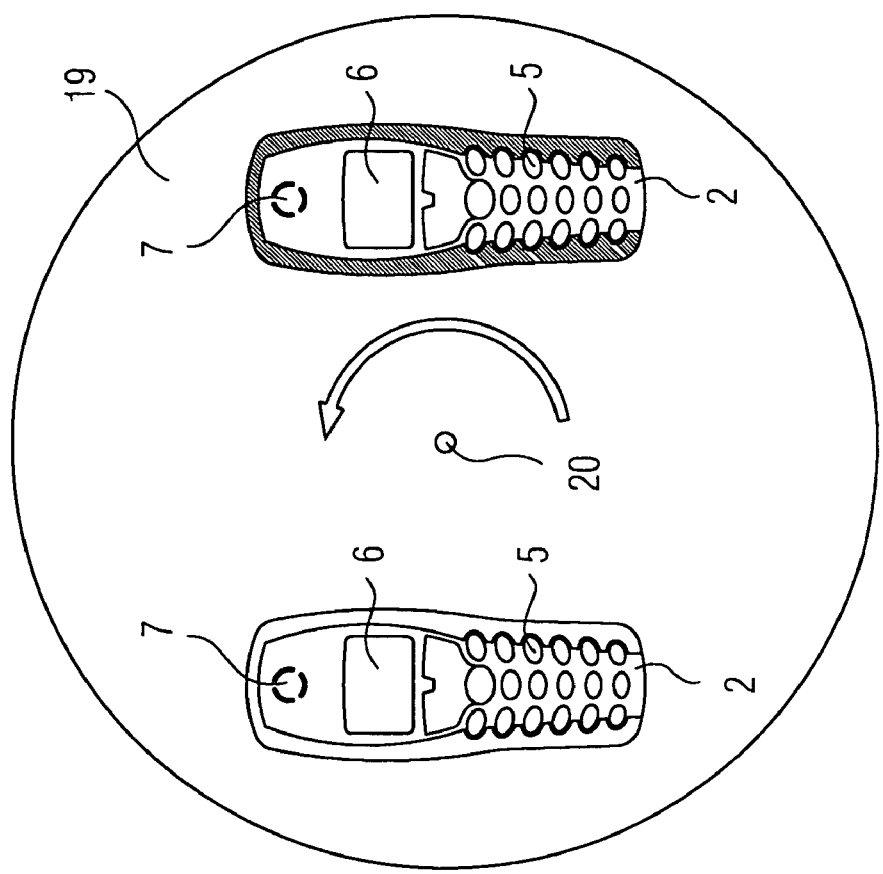
FIG. 5 shows a schematic top view of a rotary platen mold with two mounting positions for a housing part.
Figure 6:
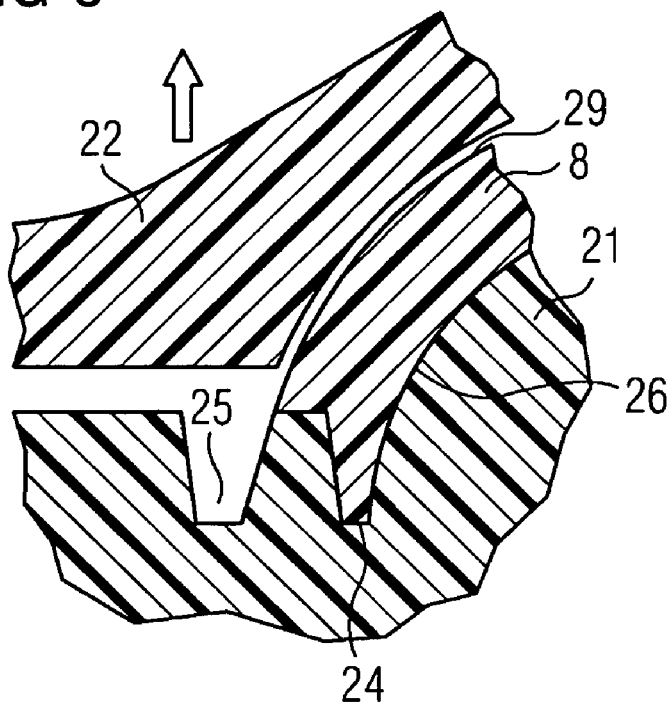
FIG. 6 shows a section of a longitudinal section through the rotary platen mold with a hard component of a housing part and one pressing die.
Figure 7:
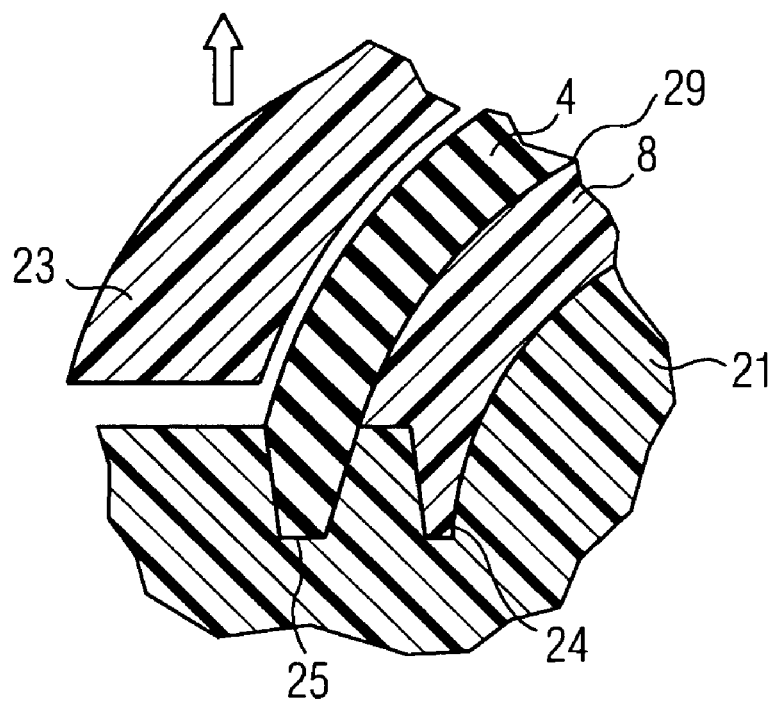
FIG. 7 shows a section by analogy with FIG. 6 with a soft component applied to the hard component and a pressing die corresponding to this.

FIG. 5 shows a schematic top view of a rotary platen mold 19 which can rotate around an axis of rotation 20. The rotary platen mold 19 has two tool structures of the same type for the production of identical housing parts (see FIG. 6, FIG. 7). The rotary platen mold 19 shown schematically in FIG. 5 is used for producing a first enclosure base body 2, an upper shell of a housing for a mobile telecommunication device. By analogy with the upper shells 2 shown in FIGS. 1 and 2, such a first enclosure base body 2 has openings for keys 5, display 6 and loudspeaker 7. A moving countertool (not shown) which can move in the direction of the axis of rotation 20 is assigned to the rotary platen mold 19 for producing the upper shell 2. The rotary platen mold 19 is the fixed half of the tool, the countertool which is not shown is the moving half of the tool. Production of the upper shell 2 takes place in two steps, whereby in a first method step after bringing together the rotary platen mold 19 and the moveable countertool 22 (see FIG. 6) a hard component is injected using the injection molding method between the rotary platen mold 19 and the first moveable countertool 22. The tool structure 21 of the rotary platen mold 19 has a hard component recess 24 and also the housing contour structure 26 joining up with it. The hard component 8 injected into the space between the rotary platen mold 19 and the first moveable countertool 22 assumes the shape of the upper shell 2 in accordance with the housing contour structure 26, whereby the hard component 8 which has penetrated into the hard component recess 24 forms a corresponding flange, for example an outer flange 14 by analogy with FIG. 4. After injection of the hard component 8, the first moveable countertool 22 is driven in the direction of the axis of rotation 20, as a result of which a deformation of the hard component 8 takes place in the vertical direction. After this first production step the rotary platen mold 19 is rotated through 180° such that the hard component 8 can now be surrounded by a second moveable countertool 23 (see FIG. 7). The cavity resulting between the hard component 8 and the second moveable tool 23 has a soft component 4 injected into it. This soft component 4 flows right into a soft component recess 25 in the rotary platen mold 19 and receives its contour through the hard component 8. In this situation, the soft component is injected onto an outside 29 of the hard component. The soft component 4, which can be a thermoplastic elastomer, is preferably then actually injected onto the hard component 8, which can be a thermoplastic material, when the hard component 8 still has a temperature which is elevated such that a good chemical bond occurs between the hard component 8 and the soft component 4. The second moveable countertool 23 is likewise raised in the direction of the axis of rotation 20 such that a deformation of the soft component 4 likewise takes place in the vertical direction (see FIG. 7). Through the soft component recess 25, the soft component 4 likewise forms a type of flange which is suited by virtue of the elastic deformability of the soft component 4 for making a seal with respect to a lower shell of the housing for a mobile telecommunication device. (Sealing flange 27 by analogy with FIGS. 8 and 9).

The sealing flange 27 and the outer flange 14, which are spaced apart from one another by a corresponding recess, are formed by the hard component recess 24 and the soft component recess 25. In this situation, it is both possible that the sealing flange 27 projects beyond the outer flange 14 or vice versa or both terminate at the same level.

FIGS. 8 and 9 show two different embodiments of a first enclosure base body 2 and a second enclosure base body 9 butting against it in a section of a longitudinal section. The first enclosure base body 2 has in each case a hard component 8 with an outer flange 14. A soft component 4 serving as a seal is applied in each case to the first enclosure base body 2 on the outside, which forms a sealing flange 27 that is adjacent to the outer flange 14 and as a result of the material property of the soft component 4 is elastically deformable. The soft component 4 makes a seal with the sealing flange 27 against the edge 10 of the second enclosure base body 9. In FIG. 9 the second enclosure base body 9 has an additional sealing flange 28 which extends into the space or recess 31 between the sealing flange 27 and the outer flange 14. Through the sealing flange 27 and the outer flange 14 which preferably extends into the lower shell 9, a channel of a labyrinth seal 30 is formed between the sealing flange 14 and the second edge 10 (see FIG. 8). In the embodiment according to FIG. 9 with the additional sealing flange 28 which extends into the recess 31 between the sealing flange 27 and the outer flange 14, an even narrower channel is formed between upper shell 2 and lower shell 9 of a labyrinth seal 30. By this means the sealing function of the housing 1 formed from first enclosure base body 2 and second enclosure base body 9 protecting against dust and moisture is further improved. By using the two-color injection molding method, as described above, different embodiments can be implemented between sealing flange 27 of the soft component 4 and of the hard component 8, in particular the outer flange 14, in respect of their mutual position, length etc.

The invention claimed is:

1. An enclosure for housing a device, comprising:
a first enclosure base body and a second enclosure base body which, together, form an enclosure for containing the device, with:
the first enclosure base body comprising a first component of the first enclosure base body formed of a relatively harder material and a second component of the first enclosure base body formed of relatively softer material and formed against the hard material of the first component, the first component comprising a first edge positioned along an outer periphery thereof and configured to extend toward the second enclosure base body; and
the second enclosure base body made of a second base material, the second enclosure base body comprising a second edge along an outer periphery thereof, for receiving the first edge, wherein the first enclosure base body and the second enclosure base body make contact with the first edge and the second edge butting against one another; and
wherein a portion of the second component of the first enclosure base body projects beyond a portion of the first component of the first enclosure to provide a sealing first flange configured to make contact with the second edge, said sealing first flange made of an elastically deformable material and wherein one of the first component of the first enclosure base body and the second enclosure base body includes a sealing channel comprising a second flange positioned along an outer periphery thereof and configured to extend into a recess formed alone the outer periphery of the other enclosure base body.

2. The enclosure according to claim 1, wherein one of the first component of the first enclosure base body and the second enclosure base body comprises a third flange positioned between the first and second flanges and configured to extend into a recess formed along the outer periphery of the other one of the first component of the first enclosure base body and the second enclosure base body.

3. The enclosure according to claim 1, wherein, when the first enclosure base body and the second enclosure base body butt against one another, a labyrinth seal is formed by multiple flanges each extending from one enclosure base body into a recess in the other enclosure base body.

4. The enclosure according to claim 1, wherein, when the first enclosure base body and the second enclosure base body butt against one another, the second edge flange is positioned interior to the first edge flange and the second edge flange is formed of a harder material than the first edge flange.

5. The enclosure according to claim 1, wherein the first enclosure base body is made from a hard plastic and the second edge flange is made from a plastic softer than the hard plastic.

6. The enclosure according to claim 5, wherein the first enclosure base body and the second edge flange are made using a two-color or two-component injection molding method.

7. The enclosure according to claim 1, wherein the first edge flange comprises a thermoplastic elastomer.

8. The enclosure according to claim 1, wherein the first base material comprises a thermoplastic material.

9. The enclosure according to claim 1, wherein the first edge flange comprises a material having a Shore hardness between 50 and 60.

10. The enclosure according to claim 1, configured for accommodating electrical, electronic, or mechanical components.

11. The enclosure according to claim 1, configured as a housing for a mobile telecommunication device.

12. The enclosure according to claim 1, further comprising:
a third enclosure base body for accommodating an exchangeable electrical power source, wherein the third enclosure base body buffs either against the first enclosure base body or against the second enclosure base body and is sealed to the respective enclosure base body by an edge flange intergrally formed in one base body and configured to extend into a recess formed in the other base body.

13. A method for producing a housing part for a mobile telecommunication device, comprising:
injecting a hard component onto a fixed tool;
shaping the hard component by a first countertool moveable in a mold release direction;
injecting a soft component forming an elastic seal onto the hard component; and
shaping the soft component by a second countertool which is moved in the same mold release direction as the first countertool for releasing the mold, wherein the method utilizes a two-color injection molding process and the housing part is formed by the hard component and the seal.

14. The method according to claim 13, wherein a rotary platen mold is used, the rotation allowing simultaneous processing of two housing parts, one having the hard component applied and one having the soft component applied.

15. The method according to claim 13, wherein the soft component is applied to the hard component while the latter is still warm.

16. A housing part, comprising:
a base body having an outer surface and an inner surface opposing one another with the inner surface including an edge perimeter; and
a flange, formed along and spaced apart from the edge perimeter, extending in a direction to press against the mating surface when contact with the mating surface is made,
wherein the flange comprises an elastically deformable material, wherein the base body is made from a hard plastic and the flange is made from a softer plastic compared to the hard plastic, and
wherein the base body and the flange form an integral part and are made by using a two-color injection molding process.

* * * * *